March 5, 1935.  B. DUTTWEILER  1,993,264
APPARATUS FOR PASTEURIZING MATERIALS OF A PASTY CONSISTENCY
Filed May 9, 1934  2 Sheets-Sheet 2
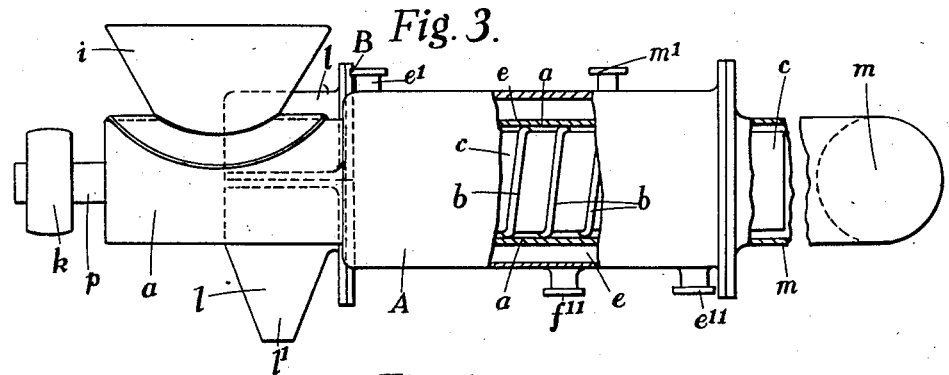
Fig. 3.
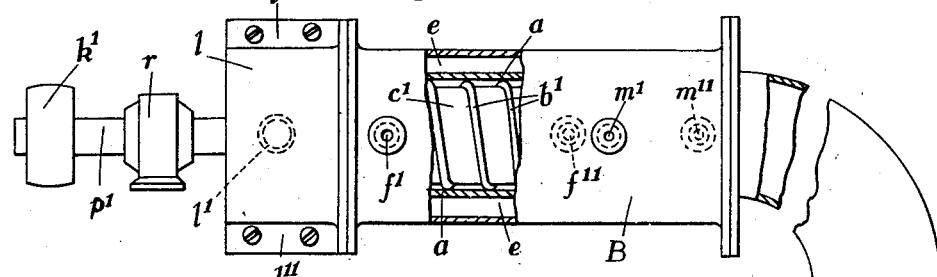
Fig. 4.
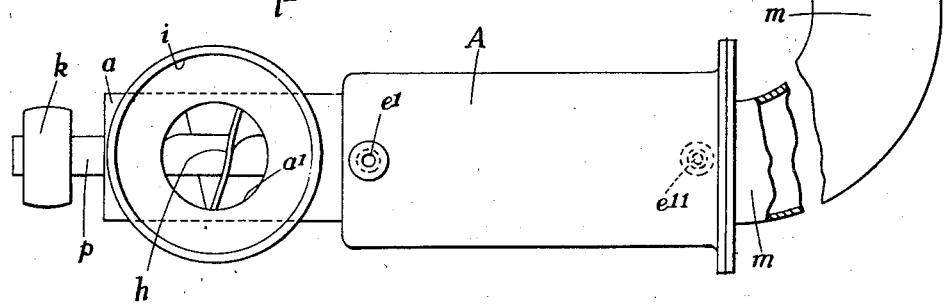
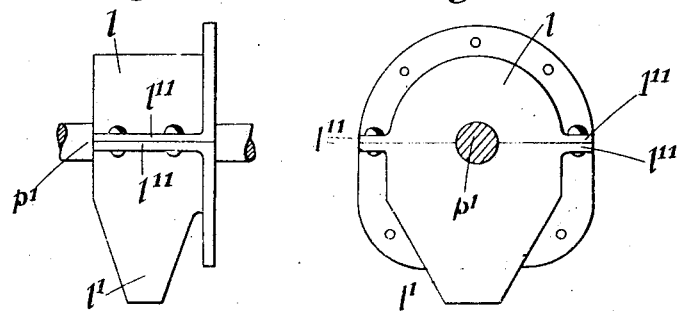
Fig. 5.  Fig. 6.
INVENTOR
Bruno Duttweiler
BY
Victor D. Borst
ATTORNEY Patented Mar. 5, 1935

1,993,264

UNITED STATES PATENT OFFICE 1,993,264

APPARATUS FOR PASTEURIZING MATERIALS OF A PASTY CONSISTENCY

Bruno Duttweiler, Vevey, Switzerland, assignor to Raw Products Limited, London, England, a company of England Application May 9, 1934, Serial No. 724,745
In Great Britain May 9, 1933

4 Claims. (Cl. 257—86)

This invention has reference to the treatment of materials for effecting pasteurization; in connection with which and in connection with the cooling or freezing of materials or liquids, it is known to subject the material or liquid in a thin layer to the effect of heat or cold, there being a jacketed chamber or cylindrical vessel containing a screw device adapted to provide a narrow path for the passage of the material or liquid therethrough while it is under the influence of the heat or the cold conveyed thereto from the surrounding jacketed chamber or cylindrical vessel. It is also known to feed material to a device such as just mentioned by means of an Archimedean screw arranged in association therewith. The screw device in the jacketed vessel, however, serves in urging the material through the same and, in the case of cooling or freezing of materials or liquids, to prevent material adhering to the surface thereof.

With material of a pasty consistency, owing to diminution of pressure incidental to the friction on the guiding surfaces and the high pressure thereby created, it has been found difficult, if not impossible, with known means to effect the travel thereof at a speed adapted to render it immune from burning and accumulating on the heated surfaces while undergoing the pasteurizing treatment and so forming thereon a heat insulating layer or coating.

It is therefore the object of the present invention to provide improved means of the kind hereinbefore referred to for use in pasteurizing materials of pasty consistency whereby the treatment is effected without risk of the heat transmitting surface, with which the thin layer of material is in contact during treatment, being coated with heat-insulating deposit from the material, and the heat transmission and the pasteurizing effect are of a constant character, the material being caused to travel rapidly along the heat transmitting surface.

According to this invention therefore a device, in the form of an Archimedean screw is foreseen as means for forcing the material continuously in a thin layer between concentrically arranged surfaces, formed respectively by a jacketed hollow cylindrical or tubular member and revolubly mounted therein, a cylindrical body having a shallow helicoidal rib thereon, the latter, while carrying the thin layer forward also maintaining the heat transmitting surface clear of deposit, thereby ensuring continuity of treatment and constant heat transmission.

The mode of working is preferably such that the thin layer of material is heated and cooled in a single apparatus as a continuous process but if desired the material, after being heated, may be separately cooled.

In order that the invention may be readily understood and carried into effect same will now be more fully described with reference to the accompanying drawings, in which:—

Figures 3 and 4 are views in elevation and plan respectively showing an arrangement of the apparatus in which two heating or/and cooling units are adapted for successively treating the material, the latter being fed into and forced first through the one and then through the other from which latter the fully treated product is delivered.

Figures 5 and 6 are detached side and face or end views respectively of the detachable bi-part collecting or delivery hopper.

$a$ indicates the hollow cylindrical or tubular member whereof the interior is machined or turned to provide a true surface for the helical screw-like rib or thread $b$ pertaining to the rotatable cylindrical body $c$ to work against with a true fit so as to operate both in forcing or travelling the material forward and in maintaining the said surface clean or clear of the material under treatment. The member $a$ is partly enclosed by a jacket $d$ which may extend the whole length of the helical thread $b$ on the body $c$ or be divided as shown, by means of a partition $d'$ so as to provide a heating chamber $e$ and a cooling chamber $f$, there being inlets $e'$ $f'$ and outlets $e''$, $f''$ for the heating and cooling media respectively, while the supports or partitions for the jacket structure $d$ are provided with suitable packing indicated at $g$ for rendering the jacket space liquid tight.

Figure 1:
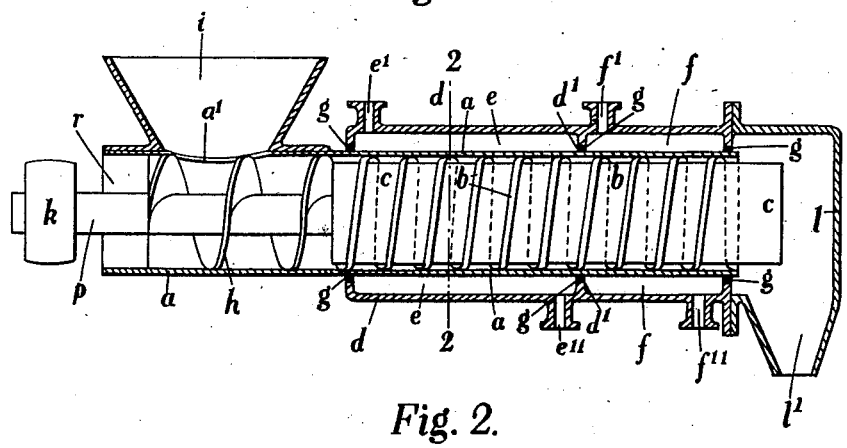
Figure 1 is a view in longitudinal vertical section showing a constructional form of the apparatus according to the invention.
Figure 2:
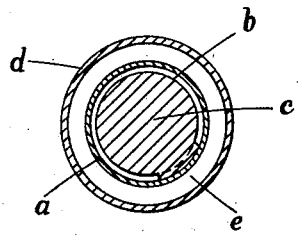
Figure 2 is a corresponding cross or transverse section taken approximately on the line 2—2 in Figure 1.

The rotatable body $c$ carries a feeding device in the form of an Archimedean screw $h$ which works in a non-jacketed extension of the member $a$ beneath the feed hopper or funnel $i$ which is secured to the said extension above a corresponding opening $a'$ therein (see Figure 1). The spindle $p$ pertaining to the feeding or forcing device $h$ is mounted in a bearing indicated at $r$ which may be of the collar thrust type and arranged within the extension or member $a$ and the said feeding device and body $c$ are actuated simultaneously by means of a belt and pulley drive, the pulley being indicated at k; or any other convenient or appropriate operating gear may be used as desired.

The end of the screw provided cylinder or body c, remote from the feeding device, is enclosed in a collecting hopper l adapted to receive the pasteurized material and deliver the same into a receptacle (not shown) placed for its reception.

The operation of the apparatus is as follows:—

The material to be pasteurized is supplied to the hopper or funnel i whence it passes or falls on to the Archimedean screw feeding device h which forces the material into the shallow helicoidal groove, formed on the rotatable cylindrical body c by the screw-like rib or thread b thereon, and under the influence of the heated portion e of the jacket which surrounds the tubular member a. Owing to the shallowness of the groove formed by the rib, or thread b, the material contained therein is quickly pasteurized and the rotation of the said body c and the thread b while operating to carry the material forward also operate to maintain the inner surface of the member a free of material and in clean condition, the rib or thread b instantly removing the material from the said surface as the result of its true fitting therewith. Heating medium may be supplied to the portion e of the jacket from any convenient source by way of the inlet e' and, similarly, cooling medium may be supplied to the portion f of the jacket by way of the inlet f'; the media being exhausted by way of the respective outlets e'' and f''.

The treated material passes from the surface of the body c into the hopper or collecting chamber l, a scraping device being provided if found necessary for effectually removing the treated material from the extremity of the said body. Such a device will be understood, however, without illustration or further description.

Referring now to the arrangement of apparatus shown on Figures 3 and 4 the material as it is treated in the part of the apparatus indicated by the letter A is conveyed by the pressure exerted thereon by the action of the helical rib b and the forcing device h into and through a conduit m to a shallow helicoidal passage formed by a similar helical rib b' in the part of the apparatus indicated by the letter B and arranged, in the construction illustrated, so that the working thereof is directionally opposite to that in the apparatus previously referred to by the letter A. The material treated in the apparatus B is received in the collecting hopper l and delivered therefrom through the outlet l'. As clearly illustrated in Figures 5 and 6, the said hopper l is conveniently constructed in two parts so as to facilitate dismantling for any purpose, such as cleaning, repairs or the like, the parts of the hopper being secured by screws or bolts passed through holes formed for their reception in the flanges l''. The rotatable cylindrical body c' pertaining to the apparatus B is actuated from the shaft p' which is belt driven by a pulley k' as in the case of the pulley k and shaft p pertaining to the apparatus A. The bearing for the shaft p may conveniently be arranged in the feeding end of the member a (see r Figure 1) while the bearing for the shaft p' may be such as indicated at r' (Figure 4).

The part A of the apparatus has provision at e' for the admission of heating medium, and, indicated in dotted lines at e'' an outlet for the spent medium while the part B has provision at f' for the admission of heating medium and an outlet at f'' for spent heating medium, there being an inlet at m' for a heating medium of lower or higher temperature degree or a cooling medium and an outlet m'' for the used medium. Thus, it will be understood that a series method of working is provided and that the number of units (apparatus A, B, for example) may be determined according to requirements, the several units being connected by curved or straight extensions of the hollow cylindrical or tubular member (a) and the feeding and delivery arranged accordingly. It may be mentioned that, in practice, it is found that the working in series as herein described is generally carried out successfully by providing the first unit or apparatus only with a forcing device as it follows that the material from the said device is forced into the helicoidal passages of the succeeding units by pressure exerted thereon by the helical ribs pertaining to the respective units.

The operating or driving means in the illustration may be modified so that both units receive motion from one shaft, the respective shafts being coupled in a manner which will be readily understood without further description or illustration. Gearing may, however, be introduced in some instances in order to enable the number of revolutions of the respective shafts to be varied.

By the apparatus herein described and the regulation of the temperature and/or the volume of the heating medium, pasteurization of various materials of pasty consistency may be carried out expeditiously and under conditions suitable therefor.

In the production or manufacture as herein described, of "processed" cheese which is a material highly sensitive to heat treatment and extremely liable to fat separation, it is found that the difficulties heretofore experienced in connection with the prevention thereof are removed and the preventive measurs ordinarily adopted rendered unnecessary the treatment whereby the cheese mass is moved in a thin layer along the heat transmitting surface enabling thorough heating thereof to be accomplished expeditiously and thus effectually to pasteurize the same in much shorter time than is possible by the methods known or adopted. It is to be observed that the period of pasteurization is of such short duration that no encouragement is afforded to the natural tendency of the fat to separate.

By judiciously arranging the several items essential to good working, viz: the temperature of the heating medium, the length of the heat transmission surface, the speed of rotation of the cylindrical body carrying the helical rib and therefore providing the helicoidal passage and the depth of the latter, fat separation can be effectually prevented. Cheese having no indication whatever of fat separation has been produced by means of apparatus such as shown in the drawings hereinbefore referred to each heat transmitting surface having a length of three metres, the first an internal diameter of seventy millimetres and the second an internal diameter of fifty-six millimetres, the two being connected by a tube of fifty-six millimetres' diameter and the respective units possessing the following operating characteristics: The depth of the helicoidal passage in the first unit is five millimetres and in the second nine millimetres, the speed of the cylindrical body in the first unit is sixty-five revolutions per minute and of that in the second unit thirty-one revolutions per minute, the temperature of the heating medium in the first unit is 98° C. and in the second unit 97° to 98° C.

With a helicoidal passage of the aforesaid depth good results have been secured when the number of revolutions has been varied as between the units to two hundred and sixty five in the first unit and one hundred and eighteen in the second and the temperature one hundred and eight to one hundred and ten degrees centigrade in both first and second unit. Thus it will be readily apparent that the method of working is not of a restricted character as regards the speed of revolution or the temperature degree of the heating medium but that it is capable of giving highly satisfactory results even when the conditions of working are subjected to considerable variation.

It is further possible to make an appreciable reduction in the quantity of the emulsifying agents usually added to the cheese mass before melting and it is found that any addition to a reasonable or suitable quantity is superfluous. To ensure effective and correct pasteurization the raw cheese is reduced to a ground or pasty granular or similar condition. If it be desired to render the cheese into a pasty mass, grinding is preferably resorted to, any suitable apparatus being employed, such as a roller mill having four rollers as will be readily understood. In this connection, the raw cheese may be given a slight heating before subjecting it to the action of the mill and it may be stated that it is found advantageous to slightly heat the rollers of the mill.

For the purpose of obtaining the prescribed composition of "processed" cheese, the addition of water in small quantity may be necessary during the treatment particularly in view of the reduction in the quantity of the emulsifying agent necessary and an increase in the amount thereof when no such agent is employed. The water is preferably added to the raw cheese just before grinding or similarly preparing the same and such water may contain flavouring, for instance citric acid, and emulsifying agents.

The construction or arrangement of the apparatus is such that the parts may be quickly sundered for cleaning or the like, it being simply necessary to remove the bearing r to render the cylindrical body c and rib or thread b thereon removable from the tubular member a.

It may be mentioned that the thread b which provides the helicoidal groove or path for the material may be varied in depth to accommodate material of different character. In this connection, the body c may be rendered interchangeable.

What I claim and desire to secure by Letters Patent of the United States is:—

1. Apparatus of the class described for pasteurizing materials of pasty consistency which comprises a series of jacketed tubular members whereof each has the inner surface rendered true by the process of machining, a series of cylindrical bodies respectively pertaining to the series of tubular members and revolubly mounted therein, a shallow helicoidal rib on each of the said revoluble cylindrical bodies adapted by its outer edge to make true fitting contact with the trued inner surface of its enclosing jacketed tubular member, a tubular connection between the jacketed tubular members, means for admitting and exhausting heating and cooling media to and from the several jacketed tubular members, means for feeding and forcing raw ground and pasty cheese into and between the ribs of the revolubly mounted cylindrical bodies consisting of an Archimedean screw device, an enclosing non-jacketed extension of the jacketed tubular member, a hopper on the latter above the screw, driving means for the screw and the cylindrical body aligned with and co-operatively related thereto, a delivery box or hopper associated with the terminal cylindrical body and operating means for the latter, adapted to drive the same in the reverse direction to that of the screw and associated initiating cylindrical body.

2. Apparatus of the class described for pasteurizing materials of a pasty consistency which comprises a series of jacketed tubular members whereof each has the inner surface rendered true by the process of machining, a series of cylindrical bodies respectively pertaining to the said series of tubular members and revolubly mounted therein, a shallow helicoidal rib on each of said revoluble cylindrical bodies adapted by its outer edge to make truly fitting contact with the trued inner surface of its enclosing jacketed tubular member, a tubular connection between the jacketed tubular members pertaining to the units of the series, means for admitting and exhausting heating and cooling media to and from the several jacketed tubular members, means for feeding and forcing pasty material into and between the ribs of the revolubly mounted cylindrical bodies consisting of a non-jacketed extension of the tubular member, a hopper on the said extension, an Archimedean screw device in the extension beneath the hopper and in axial alignment and co-operative relation with the rib-provided revolubly mounted cylindrical body, means for rotatively operating the said feeding and forcing means whereby the material is advanced along the ribbed cylindrical bodies at regulatable speeds, a detachable collecting box or hopper at the delivery end of the said series of units and means for operating the rib-provided cylindrical body to bring the material to the delivery box or hopper.

3. Apparatus of the class described for use in continuously pasteurizing cheese and other materials of similar consistency which comprises a hollow cylindrical member having a truly machined inner surface, a jacket partly surrounding the said member, a cylindrical body revolubly mounted in the jacketed part of the said member and formed with a helicoidal rib of shallow depth having its outer edge truly machined to make tight working and scraping contact with and against the truly machined inner surface of the said hollow cylindrical member, a feed hopper mounted on the non-jacketed part of the hollow cylindrical member, means in the said non-jacketed part for feeding and forcing a thin layer of the material through the passage formed by the shallow helicoidal rib on the cylindrical body and the inner surface of the hollow cylindrical member, consisting of an Archimedean screw device in axial alignment and co-operative relation with the rib provided revoluble cylindrical body, means for rotatively operating the said feeding and forcing device, means for admitting and exhausting heating and cooling media to and from the jacketed part of the hollow cylindrical member and a delivery hopper in connection with the end of the hollow cylindrical member remote from the non-jacketed part thereof.

4. Apparatus of the class described for continuously pasteurizing cheese and other materials of similar consistency which comprises a series of jacketed hollow cylindrical members whereof each has the inner surface rendered true by the process of machining, a series of cylindrical bodies respectively pertaining to the said series of hollow cylindrical members and revolubly mounted therein, a shallow helicoidal rib on each said revoluble cylindrical body adapted by its outer edge to make truly fitting contact with the trued inner surface of its enclosing jacketed hollow cylindrical member, tubular connection between the hollow cylindrical members of the series adapted to the relative disposition of the said members, means for admitting and exhausting heating and cooling media to and from the several jacketed hollow cylindrical members, means for feeding and forcing raw ground and pasty cheese into and between the ribs of the revolubly mounted cylindrical bodies consisting of a non-jacketed extension of the first hollow cylindrical member, a hopper on the said extension, an Archimedean screw device in the extension beneath the hopper in axial alignment and co-operative relation with the rib-provided revolubly mounted cylindrical body and means for rotatively operating the said feeding and forcing means whereby the material is advanced through the several units of the series at regulatable speeds.

BRUNO DUTTWEILER.